(12) United States Patent
Becker et al.

(10) Patent No.: US 8,099,713 B2
(45) Date of Patent: Jan. 17, 2012

(54) PROGRAM SYSTEM, AND METHOD AND SYSTEM ARRANGEMENT FOR CONFIGURING IT

(75) Inventors: Detlef Becker, Moehrendorf (DE);
Karlheinz Dorn, Kalchreuth (DE);
Vladyslav Ukis, Nuremberg (DE);
Hans-Martin Von Stockhausen, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 1289 days.

(21) Appl. No.: 11/332,373

(22) Filed: Jan. 17, 2006

(65) Prior Publication Data

US 2006/0161906 A1      Jul. 20, 2006

Related U.S. Application Data

(60) Provisional application No. 60/644,000, filed on Jan. 18, 2005.

(30) Foreign Application Priority Data

Jan. 18, 2005    (DE) .................. 10 2005 002 362

(51) Int. Cl.
*G06F 9/44*              (2006.01)
(52) U.S. Cl. .................................................. 717/115
(58) Field of Classification Search .............. 717/139, 717/143, 163, 165, 115; 709/220, 230; 719/328–331, 318; 715/234, 273; 706/45; 600/407

See application file for complete search history.

(56) References Cited

U.S. PATENT DOCUMENTS

| | | | |
|---|---|---|---|
| 6,691,176 B1* | 2/2004 | Narin et al. | 719/318 |
| 6,892,230 B1* | 5/2005 | Gu et al. | 709/220 |
| 7,500,188 B1* | 3/2009 | Trapani et al. | 715/273 |
| 2004/0015537 A1 | 1/2004 | Doerksen | |
| 2004/0024303 A1* | 2/2004 | Banks et al. | 600/407 |
| 2005/0097579 A1* | 5/2005 | Dorn et al. | 719/330 |

FOREIGN PATENT DOCUMENTS

| | | |
|---|---|---|
| CN | 1167011 C | 9/2004 |
| WO | WO 2004008332 A1 | 1/2004 |

OTHER PUBLICATIONS

Boudreaux Bodine; Boudreaux Bodine, Microsoft; Windows Media; handling Events; Feb. 19, 2009, S.1 [www.med2d.com, .NET Tips, XML, windows media: handling events]; [www.med2d.com, .NET Tips, XML, windows media: handling events]; Others; 2002.
Tclsh—Simple shell containing Tcl. Interpreter. <http://ad.informatik.uni-freiburg.de/bibliothek/tutorials/tcltk/tclsh.html> in: <http:web.archive.org> am Nov. 4, 2003; Others; 2003.
Ffidl <http://wiki.tcl.tk/1197> in: <http://web.archive.org> am Oct. 22, 2004.

* cited by examiner

*Primary Examiner* — Tuan Anh Vu
(74) *Attorney, Agent, or Firm* — Harness, Dickey & Pierce, P.L.C.

(57) ABSTRACT

A method and system arrangement are disclosed for configuring a program system. The method includes initializing binary program components of the program system and a source code interpreter for interpreting at least one source code event handler. Logical connections are set up between interfaces of the binary program components and interfaces of the interpreted source code event handler in order for events generated by the binary program components to be processed by the at least one source code event handler. A configuration file may also additionally be evaluated.

27 Claims, 1 Drawing Sheet

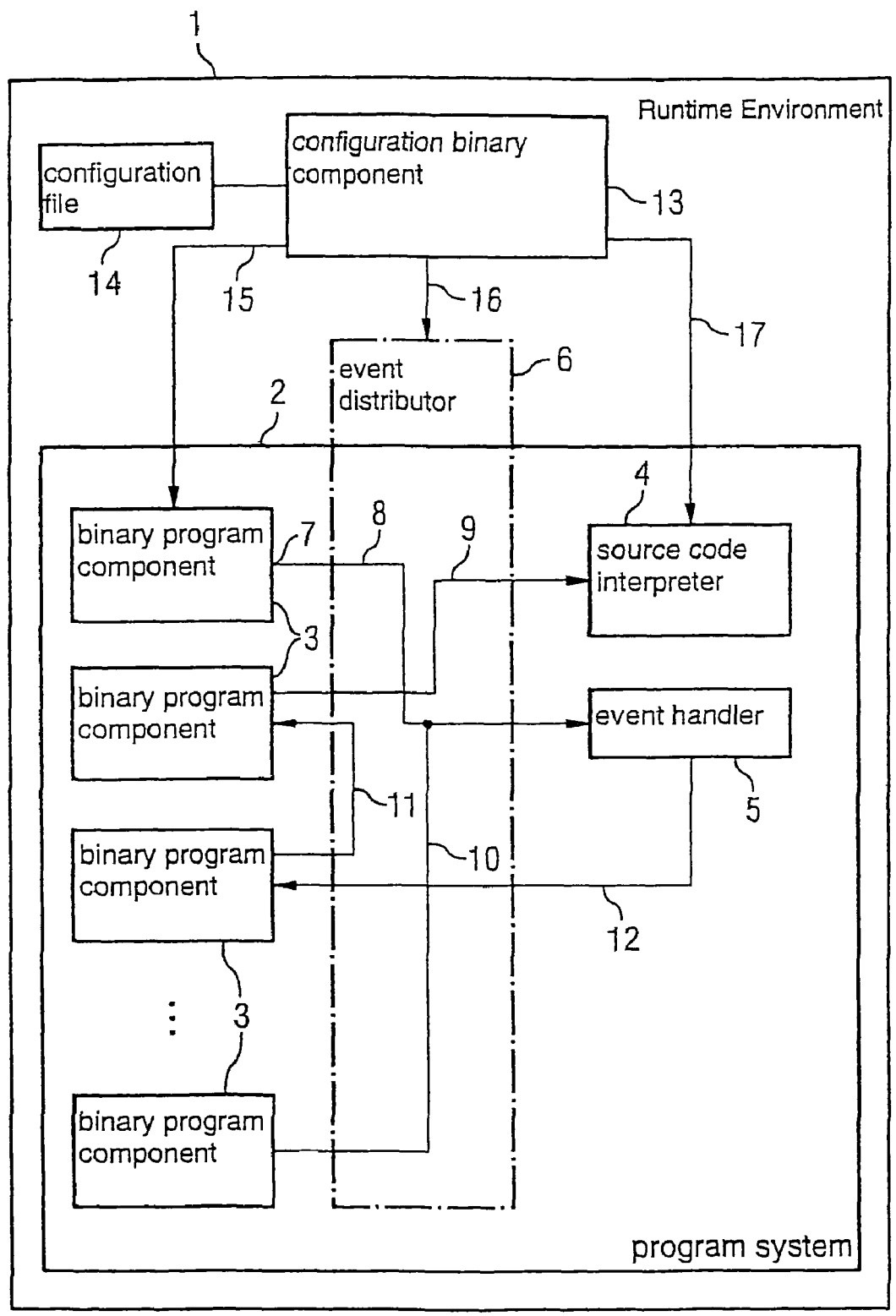

PROGRAM SYSTEM, AND METHOD AND SYSTEM ARRANGEMENT FOR CONFIGURING IT

The present application hereby claims priority under 35 U.S.C. §119 on German patent application number DE 10 2005 002 362.2 filed Jan. 18, 2005, and claims priority under 35 U.S.C. §119 on U.S. provisional patent application No. 60/644,000 filed Jan. 18, 2005, the entire contents of each of which is hereby incorporated herein by reference.

FIELD

The present invention is generally directed to a method and/or a system arrangement for configuring a program system composed from binary program components and interpreted event handlers and at the program system.

BACKGROUND

The present state of the software art is distinguished in that generally different applications are programmed on the basis of existing software frameworks. There are likewise expansion opportunities for existing frameworks.

A paradigm for producing programs is what is known as component-based programming, in which—in similar fashion to in the case of object-oriented programming—a program is created from self-contained entities. In contrast to object-oriented programming, however, the components are provided by suppliers and are already compiled program elements, which are therefore in binary form, of which the respective programmer knows only the interface definitions for interaction with other components. Expansions to frameworks are generally binary, particularly in the case of components, which means that a binary module created in accordance with the rules of the expanded framework needs to be generated and connected in order to be able to expand the framework as a whole.

A program system within the meaning of the present description is to be understood to include an integral program which includes a plurality of program elements and in which the individual program elements, for example components etc., are connected to one another by software interfaces in order to allow them to interact. Typically, an application includes a series of such interacting components. If the components of an application or a program system are logically connected to one another, it is impossible to adapt the connections to the changing demands for the program system without changing the source code of the program system and then having to recompile it.

In the event of demand changes, the program system had to be adapted and retranslated in the source text, which was impossible without access to the source code of the program system or of the components which needed to be changed. By way of example, if a display program for visual elements in a particular format is also suitable for displaying visual elements in another format, which means that an NMR application is also suitable for displaying AX images, for example, but requires certain adaptation in order to display the other display formats, it has not been possible to date to alter the program if the source text was not available, which was generally the case. It was therefore necessary to program a completely new display for the new visual data.

In object-oriented systems, in which the elements are not "linked" until during the program system's runtime, it is possible to replace objects with other objects having other, for example expanded, capabilities while program starting is still in progress. In this way, it is possible to influence the behavior of an application to the extent that the object-internal behavior of individual objects is affected. Even in the case of such an object-oriented system with linking at the program starting time (or even not until the program is running), however, it is not possible to change the interaction between various objects without knowledge of the source text.

Object-oriented and component-oriented program systems are most usually event-driven. Thus, the individual components or objects of a program system when the program system is being executed can generate "events" which are sent via one or more event queues to other objects, prescribed by the programming, at which point the data linked to the event are processed further in line with the type of event. The forwarding of the events has a permanent link within the context of application creation, as described above. It is not possible to influence the reaction of event handlers to the events sent to them either, since these too are created and compiled using the programming tools available. This in turn applies particularly to the reciprocal reaction of the event handlers, which generate new events and forward them to other objects or components of a program system.

To actually be able to change the behavior of such a program system, it would be necessary to be able to alter the distribution of the events, i.e. the connection between the individual interfaces which are present, and also the reaction of the event handlers.

SUMMARY

It is an object of an embodiment of the present invention to provide an appropriate system to allow alteration of the application using the components or of the program system even without knowledge of the source code of the components used.

At least one embodiment of the invention may achieve an object by providing a method for configuring the program system, by use of a system arrangement for configuring a program system and/or by use of a framework system arrangement.

At least one embodiment of the invention includes an idea of making the actual form of the event handlers and possibly the linking of components to the event handlers easily configurable and retrospectively adaptable.

At least one embodiment of the invention is therefore first of all directed at a method for configuring a program system which has the following steps:

binary program components of the program system, which are intended to generate events, are initialized;

a source code interpreter which interprets at least one source code event handler is initialized; and logical connections are set up between interfaces of the binary program components and interfaces of the interpreted source code event handler in order for events to be processed by at least one source code event handler.

In this context, a program system is to be understood to be an executable computer program which includes a plurality of isolated components interacting via interfaces. A runtime environment is to be understood to be the entire program code that is provided by an operating system in order to allow programs of a particular style to be executed. It includes not only system function calls (system calls) but also libraries specific to a particular programming environment etc., and contains, in principle, all precautions which are required in order to allow the program system to be executed on the chosen data processing installation. Binary program components are to be understood to be component-type parts of a program which have been compiled, i.e. transformed into a binary form which can be executed by the processor used, using a compiler before the program is actually started. These include classical components and objects and also novel variations of these constructs.

An event handler may include a program or subprogram which is used to handle an event sent by another component and possibly to output a result, e.g. a result event. A source code interpreter may include a program, a program section or a program component, for example a further binary program component, which is able to interpret a source code, to execute the instructions contained in the source code successively and to convert them directly into binary instructions, this operation being performed, in contrast to compilation, step by step whenever the source code program is executed. Classical examples of interpreted programs are programs written in the programming language "BASIC" or scripts written in script languages.

Within the context of embodiments of the invention, a source code interpreter is also intended to include a program which is able to produce a binary program from a source code file in one pass when said source code file is called, provided that this program production involves renewed performance whenever the source code file is called and there is no value placed on the result of the interpretation being the generation of a program which can be executed independently in the runtime environment.

An interface is understood to include a software-based construct which uses a predefined mechanism to allow information to be interchanged between two components, objects or programs. In the present example case, the information interchanged includes events, with an event including at least an identifier for the type of event, possibly meta-information and possibly data relating to the event. Events can be generated in reaction to particular incidents, which may arise either on the hardware (keyboard key pressed, mouse clicked, a buffer in the serial interface filled etc.) or within a component (execution of a subfunction, detection of a limit value within an algorithm, error condition etc.).

In one particular example embodiment of the invention, the method involves a configuration file being evaluated by a configuration binary program component running in a runtime environment, with the configuration file containing information about the binary program components, the at least one source code event handler and their logical connections to one another.

A configuration file within the meaning of at least one embodiment of the present invention includes a file which contains information, in an editable—that is to say plain text—form, about what binary program components and source code event handlers form the program system and how these are to be connected to one another in order to allow events to be interchanged.

The inventive method of at least one embodiment now allows a large degree of intervention in the functionality of a program system by virtue of both the way in which events are handled, dealt with, processed or answered by the program system being contained in an easily editable source text format in the system and optionally the interaction of the individual components of the program system being contained in an easily editable configuration file. Hence, the very aspects of a program system for which practice-related changes ought to occur most frequently of a simple adaptation are possible even without knowledge of a source code for the individual program components.

Expressed another way, the entire logical interconnection of the program components forming the program system is configured, and set up in the runtime environment, only at the program's runtime, preferably when the program starts.

The logical connections may be set up, for example, by configuring an event distributor whose task is to receive events centrally and to use a distribution table or the like to forward them to the previously assigned event handlers. The event distributor may be the distributor normally used in the runtime environment or a special distributor incorporated into the program system (for example by a further program component).

The new components including configuration binary program component, source code interpreter and event distributor, which the invention provides, may be components which are separate from one another or may at least to some extent be combined into a single component which, by way of example, is then able both to read the configuration file and to execute the scripts and possibly even to forward the events. It is thus conceivable that all the binary components involved forward their events automatically to the inventive new component and that the latter performs distribution to the individual event handlers.

The evaluation of the configuration file for program components and event handlers to be linked by the configuration binary program component may be done, for example, when the program system is started. In an alternative embodiment, the configuration file may be evaluated by the configuration binary program component at prescribed intervals of time during the execution of the program system. While the first of the two possible variants for evaluating the configuration file improves the performance of the program system, since appropriate configuration of the components needs to be performed only once, the more complex, more involved and slower second variant allows intervention even into running program systems, for example in the case of applications which need to run at all times and cannot be turned off.

In certain embodiments of the invention, the source code interpreter is likewise a binary program component which is able to be executed in the same runtime environment as the binary program components. This measure is used for the integration of the integral system, since mechanisms for interchanging information between components already exist within a runtime environment and hence do not have to be reimplemented specifically for embodiments of the present invention.

The source code interpreter may be a commercially available interpreter which is encased by relevant additions such that it can be executed autarkly in the runtime environment and so as to make a connection to the other program components. To implement the source code event handlers, it is possible to use languages adapted to the runtime environment. Full programming languages can be used which are interpreted, such as BASIC or FORTH, but preferably script languages which are easy to program and are normally contained in modern runtime environments or are incorporated by third parties. Accordingly, the source code of the event handler is a script written in a script language. Possible script languages may be Javascript, Jscript.NET, VBScript, Perl, VBScript.NET, Python, Ruby, Tcl, C# and the like, for example.

The configuration file is preferably a plain text file with a prescribed syntax which can be evaluated by the configuration binary program component. In this case too, it is appropriate to resort to already existing models in order to minimize the program involvement for implementing embodiments of the present invention. It may thus be possible, for example, to use file browsers which already exist on the market, for example browsers for "markup languages", such as SGML or XML. Accordingly, the configuration file is a file which needs to obey the XML syntax. To implement the invention, it is possible to use a standard XML browser, to which a document type definition or the like is in turn equated which stipulates the interpretation of the XML data in the configuration file.

At least one embodiment of the invention is also directed at a system for generating a program system. All that has been said in relation to embodiments of the inventive method also applies mutatis mutandis to the system and vice versa, so that reciprocal reference is made.

At least one embodiment of the invention is therefore directed at a system for generating the program system which has:
- a source code interpreter for interpreting at least one source code event handler;
- a runtime environment for initializing and executing binary program components for the program system; and for executing the source code interpreter, and
- an apparatus for setting up logical connections between interfaces of the binary program components and interfaces of the interpreted source code event handler in order for events generated by the binary program components to be processed by at least one source code event handler.

The conceptualities correspond to what has already been explained above.

Embodiments of the inventive system may be characterized in that the connection apparatus has a configuration binary program component for evaluating a configuration file which contains information about the binary program components of the program system which is to be generated, about at least one source code event handler for the program system and about their connection to one another.

As can be seen, embodiments of the inventive system has great store set by the various components being executable in a common runtime environment. This allows the individual parts, for example the binary program components, of the XML browser and the component with the script interpreter to be integrated. As explained previously, the source code interpreter is preferably a binary program component which runs in the same runtime environment as the binary program components, and the source code event handler is preferably a script written in a script language, for example Javascript, Jscript.NET, VBScript, Perl, VBScript.NET, Python, Ruby, Tcl or C# etc.

The configuration file is in turn preferably a plain text file with a prescribed syntax which can be evaluated by the configuration binary program component, for example an XML syntax.

Finally, at least one embodiment of the invention is directed at a program system which is created using the above mechanisms and which has:
- a plurality of binary program components which can generate events during execution and can output them to the outside via interfaces;
- at least one interpreted source code event handler which is intended to handle events received from at least one of the binary program components via logical connecting paths, where the source code event handler is interpreted by a source code interpreter at the runtime and/or at the starting time of the program system, and where the binary program components and at least one interpreted source code event handler are intended to be executed in a runtime environment.

In one example embodiment, the interpreted source code event handler is intended to output results of the reaction to received events as result events to binary program components. This provides a return channel which allows not only events to be sent to the appropriate event handlers but also, conversely, the event handlers to generate new events or other operations, which in turn can be sent to other binary program components, as the result of their event handling. It is thus possible, by way of example, when a particular calculation event occurs, to allow the event handler to handle the event, this then needing to be displayed in a display program component, to which end the event is sent with the results of the calculation to this display component.

The program system may also include a configuration binary program component which is intended to set up logical, directional connecting paths between interfaces of the binary program components and interfaces of the event handlers using the evaluated configuration file. The purpose of the configuration binary program component has already been explained above. The connecting paths between the interfaces are to be regarded as program-based or logical connecting paths and not as physical ones. They are directional because information flows in one particular direction, it being entirely conceivable for a binary program component which exists in the system both to output data to an event handler and to receive data which the latter has in turn handled as a result event.

As explained, the configuration file is usually evaluated when the program system starts. Hence, the configuration binary program component does not in the strict sense need to be part of the configured program system, since it would no longer be required for executing the program system at runtime. If intervention is also required during program execution, however, the configuration binary program component needs to be part of the program system in order to be able to reevaluate the configuration file dynamically at prescribed intervals of time and to be able to readapt the connecting paths as appropriate. As already stated in relation to the method, the source code interpreter may in one example embodiment likewise be a binary program component which is able to be executed in the same runtime environment as the binary program components.

The source code event handler may be a script written in a script language, for example in Javascript, Jscript.NET, VBScript, Perl, VBScript.NET, Python, Ruby, Tcl, C# etc. The configuration file used in line with at least one embodiment of the invention may be, for example, a plain text file with a prescribed syntax which can be evaluated in the configuration binary program component, for example an XML syntax.

The introduction of at least one component which encapsulates the interactions among other components localizes these interactions. It is also possible to specify the interactions in a script language. Adaptation of the script code allows the behavior of the application to be adapted without having the source code of the entire application available. In addition, it is possible to expand the application by configuring the components and to interchange its components.

At least one embodiment of the inventive system and/or method can be used to construct applications (program systems) whose business logic can be expanded, interchanged and even adapted. The wiring of the components of an application can be altered flexibly from the outside by using a script. It is thus easily possible to adapt an application, for example an application in the field of medical technology, to the circumstances of its use without needing to alter the source code of the application.

Embodiments of the inventive method described above and/or the systems may be in the form of a computer program product, in particular, with a computer-readable medium and a computer program and associated program code, with the computer being prompted to perform the inventive method described above on the basis of data from the computer program, that is to say from the program system.

An alternative way of achieving an object provides a storage medium which is intended to store the computer-implemented method or system described above and which can be read by a computer.

Further advantageous refinements, aspects and details of the present invention can be found in the detailed description and in the appended drawings.

BRIEF DESCRIPTION OF THE DRAWINGS

The detailed description of the figures which follows discusses example embodiments (which are not to be understood as restrictive) with their features and further advantages with reference to the drawing figures, in which:

FIG. 1 shows an overview representation of a system for generating a program system, including the program system which is to be generated.

DETAILED DESCRIPTION OF THE EXAMPLE EMBODIMENTS

FIG. 1 shows a schematic illustration of a program system 2 embedded in a runtime environment 1. The program system includes a series of binary program components 3. These software components 3 are binary, i.e. already compiled, and can be purchased complete by the supplier of the runtime environment or by further manufacturers, but may also be programmed independently, according to need. A source code interpreter 4 executes event handlers 5 written in a script language or in another suitable interpretable language. In addition, an event distributor 6 is required which embeds into the runtime environment and/or into the program system and which forwards events generated by the components to the outputs 7 via logical connecting paths 8, 9, 10 for example to the interpreting component 4, which then passes them to the scripts.

It is also possible to implement at least one embodiment of the invention such that the events are forwarded logically directly to the scripts (cf. arrow 8). The connection 11 shows that by configuring the system it is also possible to set up connections between binary program components 3. As element 12 shows, it is likewise possible for the events to be returned from events back to the same or other binary program components 3, where they are processed further. This achieves linking and also handling of the events on the individual components in the inventive program system using the mediator point for the scripts.

FIG. 1 also shows those components of the inventive system for configuring an operating system which need to be additionally added in order to configure the program system. It shows a configuration binary component 13 which reads in a configuration file 14 and uses the information contained in the latter to call the required binary components, this being able to be done via connection 15 and using ordinary calls in the runtime environment, for example. Likewise, connection 16 is used to configure the distributor 6 in line with the stipulations such that the correct connections for the events can be set up between the components and the event handlers. Finally, connection 17 is used to call the necessary event handlers. It goes without saying that the illustration is highly schematic in order to clarify the basic principles of the present invention, but it is assumed that the information presented here allows the person skilled in the art to implement at least one embodiment of the invention for specific runtime environments, operating systems, programming languages and development environments without any further action.

The system may include an XML specification in the form of a configuration file from components of the program system, as the listing below shows:

```
<BUSINESS_FORM LOGID="FORM1">
    <BUSINESS_COMPONENT LOGID="VIEWING"
    TYPE="MyComponents.BusinessComponent.Viewing"
    ASSEMBLY="\Projects\ MyCompo-
nents.BusinessComponent.Viewing.dll">
        <BUSINESS_OBJECT LOGID="ViewingLayout"
        TYPE="MyComponents.BusinessObject.ViewingLayout"
        ASSEMBLY="\Projects\MyCompo-
nents.BusinessObject.ViewingLayout.dll">
            <INTERFACES>
                <INTERFACE TYPE="ILayout"/>
            </INTERFACES>
        </BUSINESS_OBJECT>
    </BUSINESS_COMPONENT>
    <BUSINESS_COMPONENT LOGID="FUSION"
    TYPE=" MyComponents.BusinessComponent.Fusion"
    ASSEMBLY="\Projects\ MyCompo-
nents.BusinessComponent.Fusion.dll">
        <BUSINESS_OBJECT
        LOGID="FusionAlgorithm"          TYPE="
MyComponents.BusinessObject.FusionAlgorithm"
        ASSEMBLY="\Projects\ MyComponents.BusinessObject.
FusionAlgorithm.dll">
            <INTERFACES>
                <INTERFACE TYPE="IFusion"/>
            </INTERFACES>
        </BUSINESS_OBJECT>
    </BUSINESS_COMPONENT>
    <CONNECTION>
        <EVENTHANDLER LOGNAME="DrawingHandler"
            PROGID="MyComponents.EventHandler.Drawing,
\Projects\MyComponents. EventHandler.Drawing.js"
INITMETHOD="Init" />
        <EVENTHANDLER LOGNAME="ComputingHandler"
            PROGID=" MyComponents.EventHandler.Computing,
\Projects\MyComponents. EventHandler.Computing.js"
        INITMETHOD="Init" />
        <EVENT LOGNAME="VIEWING "
EVENTMETHOD="DrawGraphics">
            <SUBSCRIPTION LOGNAME="DrawingHandler"
                    HANDLERMETHOD="Draw"/>
        </EVENT>
        <EVENT LOGNAME="FUSION"
        EVENTMETHOD="FuseImages">
            <SUBSCRIPTION LOGNAME="ComputingHandler"
                HANDLERMETHOD="Compute"/>
        </EVENT>
    </CONNECTION>
</BUSINESS_FORM>
```

The listing shows an example specification of the components of an application and of the association with event handlers. The file specifies two "business components", namely first the business component "Viewing", which is used to display objects, and secondly the business component "Fusion", which fuses files. This business component is implemented using the dynamic link library "MyComponents.Businesscomponent.viewing.dll", whereas the "Fusion" component is implemented using the dynamic link library "MyComponents.Businesscomponent.fusion.dll".

The individual subsections also define specific business objects which are to be used, and also define interfaces. The section with the "Connection" tag defines two event handlers, namely a drawing handler and a computing handler. The "Event" tag then makes the actual links. As can be seen from the listing, the occurrence of a "Draw Graphics" event on the "Viewing" component prompts the event to be forwarded to the "Drawing Handler" event handler, with the "Draw" method being intended to be used within the handler. Similarly, the occurrence of the "Fuse Images" event on the "Fusion" business component prompts the "Computing Handler" event handler to be called with the "Compute" method.

The implementation of this functionality using an XML file makes it an extremely simple matter to alter these associations which have been made as required.

An event handler provides a series of functions which are called automatically upon particular events. In this context, the event handler is preferably written in a script language, such as Jscript, VBScript or in NET corresponding to Jscript-.NET, VB.NET or C#. The advantage of a script language is that the script is interpreted at the runtime and therefore can still be attached following delivery of the system.

The listing below illustrates an event handler in Jscript-.NET:
import System;
package MyComponents.EventHandler

```
{
    public class Computing
    {
    var MyBusinessComponents;
    public function Init(parent : Object) : void
    {
        myBusinessComponents=parent.GetBusinessComponents( );
    }
    public function Compute(sender : Object, e :EventArgs)
: void
    {
        //Compute a fusion
        ...
        var Fused_Image_DB_ID = "4711";
        //access the Drawing Business component to display
        //the fused image
        myBusinessCompo-
nents["VIEWING"].Display(Fused_Image_DB_ID);
    }
}
```

This case involves an event handler from the "MyComponents.Event-Handler" packet, specifically as illustrated by "Public Class", the "Computing" event handler, which has already been called Computing Handler in the first listing and to which reference has been made by the corresponding "My Components.eventhandler.computing" progID. First of all, the INIT( ) function of the event handler is called, and there the handler can obtain access to the components which are connected to it. Next, the compute function is called if the "Fusion" component is generating the "fusion image" event, cf. the first listing. In the function itself, the fusion is performed and the database ID from the fused image is transferred to the "Viewing" component for display.

An event handler provides access to all configured components. Thus, they can be connected in the script. Accordingly, the wiring of the components can be flexibly adapted without modifying the source code of the actual components, so that the function logic of a program system, i.e. an application, can be adapted.

To be able to expand this function logic, new components can be configured into the program system during configuration. However, it is likewise possible to add new components to the script code at runtime. If required, the components in the script which are added at runtime can be refreshed further, i.e. the function logic can be expanded either statically through configuration or dynamically by calling particular methods in the script. To be able to make such dynamic expansions, the script provides handling.

The actual function logic can also be replaced. This can be achieved by virtue of particular components in the configuration file being interchanged. By way of example, a component for displaying the medical images of a particular type (e.g. MR—magnetic resonance) can be replaced by another component for displaying the images of another type (e.g. CT—computer tomography). However, it is possible for both components CT and MR to be configured and used simultaneously in the script.

Any of the aforementioned methods may be embodied in the form of a system or device, including, but not limited to, any of the structure for performing the methodology illustrated in the drawings.

Further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, such as floppy disks (trademark), cassette tapes, and removable hard disks; media with a built-in rewriteable non-volatile memory, such as memory cards; and media with a built-in ROM, such as ROM cassettes.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for generating a software application, comprising:
    initializing, using a processor, binary program components of the software application, the binary program components including binary code compiled from source code and configured to generate events, the binary program components configured to forward the events and configured to react to received events according to the binary code of the binary program components;
    initializing, using the processor, a source code interpreter configured to interpret at least one source code event handler; and
    setting up, using the processor, logical connections between interfaces of the binary program components and interfaces of the interpreted source code event handler to permit the generated events to be processed by the source code event handler where the source code event handler is configured to provide one or more functions in response to the generated events, wherein
    the logical connections between the interfaces of the binary program components and the interfaces of the interpreted source code event handler are changeable to adjust a functionality of the program system during runtime without modifying the binary code of the binary program components, the logical connections are set up by configuring an event distributor, the event distributor configured to be embedded into the runtime environment, to receive the events from one or more of the binary program components and to redistribute the events to at least one of the source code interpreter, the at least one source code event handler and the binary program components, according to instructions of an editable configuration file; and evaluating the configuration file by a configuration binary program component running in a runtime environment, the configuration file maintaining a text-editable list of the binary program components, the source code event handlers, and the logical connection between and among the binary program components and the source code event handlers, the configuration file configured to change the logical connections between and among binary program components and source code event handlers of the software application to alter the application's functionality without amending source code.

2. The method of claim 1, wherein the logical connections are set up by configuring an event distributor according to the instructions of the editable configuration file.

3. The method as claimed in claim 2, wherein at least two of the parts including configuration binary program component, source code interpreter and event distributor are combined in a binary program component.

4. The method as claimed in claim 1, wherein at least two of the parts including configuration binary program component, source code interpreter and event distributor are combined in a binary program component.

5. The method as claimed in claim 1, wherein the configuration file is evaluated by the configuration binary program component when the program system is started.

6. The method as claimed in claim 1, wherein the configuration file is evaluated by the configuration binary program component at prescribed intervals of time during the execution of the program system.

7. The method as claimed in claim 1, wherein the source code interpreter is likewise a binary program component, executable in the same runtime environment as the binary program components.

8. The method as claimed in claim 1, wherein the source code event handler includes a script written in a script language.

9. The method as claimed in claim 8, wherein the script language is at least one of Javascript, Jscript.NET, VBScript, Perl, VBScript.NET, Python, Ruby, Tcl and C#.

10. The method as claimed in claim 1, wherein the configuration file is a plain text file with a prescribed syntax, that is evaluated by the configuration binary program component.

11. The method as claimed in claim 10, wherein the configuration file corresponds to the XML syntax.

12. A computer program, configured to, when executed on a computer, cause the computer to carry out the method as claimed in claim 1.

13. A computer program product, including the computer program of claim 12.

14. A computer readable medium, configured to, when run on a computer, cause the computer to carry out the method as claimed in claim 1.

15. The method of claim 1, wherein the logical connections are defined in the configuration file to connect each generated event with a method for handling each generated event.

16. A system arrangement of a medical imaging device for generating a program system, comprising:

at least one source code interpreter, including a first processor of a computer device of the medical imaging device, configured to interpret at least one source code event handler;

a runtime environment module, including a second processor of the computer device of the medical imaging device, configured to initialize and execute binary program components for the program system and to execute the at least one source code interpreter, the binary program components including binary code compiled from source code and configured to generate events, the binary program components configured to forward the events and configured to react to received events according to the binary code of the binary program components; and at least one connection apparatus, including a third processor of the computer device of the medical imaging device, configured to set up logical connections between interfaces of the binary program components and interfaces of the interpreted source code event handler, in order for the events generated by the binary program components to be processed by at least one source code event handler, where the source code event handler is configured to provide one or more functions in response to the generated events, wherein the logical connections between the interfaces of the binary program components and the interfaces of the interpreted source code event handler are changeable to adjust a functionality of the program system during runtime without modifying the binary code of the binary program components, the logical connections are set up by configuring an event distributor, the event distributor configured to receive the events from one or more of the binary program components and configured to redistribute the events to at least one of the source code interpreter, the at least one source code event handler and the binary program components, according to instructions of an editable configuration file, and the connection apparatus further includes a configuration binary program component, including a fourth processor of the computing device of the medical imaging device, for evaluating a configuration file, the configuration file maintaining a text-editable list of the binary program components, the source code event handlers, and the logical connection between and among the binary components and the source code event handlers, the configuration file configured to change the logical connections between and among binary program components and source code event handlers.

17. The system arrangement as claimed in claim 16, wherein the source code interpreter is likewise a binary program component, executable in the same runtime environment as the binary program components.

18. The system arrangement as claimed in claim 16, wherein the source code event handler includes a script written in a script language.

19. The system arrangement as claimed in claim 18, wherein the script language is at least one of Javascript, Jscript.NET, VBScript, Perl, VBScript.NET, Python, Ruby, Tcl and C#.

20. The system arrangement as claimed in claim 16 wherein the configuration file is a plain text file with a prescribed syntax, that is evaluated by the configuration binary program component.

21. The system arrangement as claimed in claim 20, wherein the configuration file corresponds to the XML syntax.

22. The system arrangement of claim 16, wherein the logical connection provides a name for the source code event handler that corresponds to each generated event, and a name for a one of a plurality of methods of the source code event handler that implements source code based on each generated event.

23. A framework system arrangement of a medical imaging device, the frame system arrangement comprising:
   a plurality of binary program components, including a first processor of a computer device of the medical imaging device, the binary program components including binary code compiled from source code and configured to, even during execution, at least one of receive and generate events via logical connecting paths and to output said events via interfaces, the binary program components configured to forward the events and configured to react to received events according to the binary code of the binary program components;
   at least one interpreted source code event handler, including a second processor of the computer device of the medical imaging device, configured to handle the events received via the logical connecting paths, the at least one source code event handler being interpreted by a source code interpreter at least one of at the runtime and at the starting time of the program system, and the binary program components and at least one interpreted source code event handler being executable in a runtime environment, where the source code event handler is configured to provide one or more functions in response to the generated events, wherein
      the logical connecting paths between the plurality of binary program components and the interpreted source code event handler are changeable to adjust a functionality of the program system during runtime without modifying the binary code of the binary program components, and
      the logical connecting paths are set up by configuring an event distributor, the event distributor configured to be embedded into the runtime environment, to receive the events from one or more of the binary program components and to redistribute the events to at least one of the source code interpreter, the at least one source code event handler and the binary program components, according to instructions of an editable configuration file; and
   a configuration binary program component, including a third processor of a computer device of the medical imaging device, to set up logical, directional connecting paths between interfaces of the binary program components and interfaces of the source code event handlers using the evaluated editable configuration file, the configuration file maintaining a text-editable list of the binary program components, the source code event handlers, and the logical connection between and among the binary components and the source code event handlers, the configuration file configured to change the logical connections between and among binary components and source code event handlers of the program system to alter the program's functionality without amending source code.

24. The framework system arrangement as claimed in claim 23, wherein the source code event handler outputs results as its reaction to received events as result events to binary program components.

25. The frame system arrangement of claim 23, wherein the logical connecting paths are defined in the editable configuration file as a block of editable text that designates a source code event handler and a method of the source code event handler that is implemented when each event is generated.

26. A system arrangement of a medical imaging system for generating a program system, comprising:
   at least one source code interpreter means, including a first processor of a computing means of the medical imaging device, for interpreting at least one source code event handler;
   runtime means, including a second processor of the computing means of the medical imaging device, for initializing and executing binary program components for the program system and for executing the at least one source code interpreter means, the binary program components including binary code compiled from source code and configured to generate events, the binary program components configured to forward the events and configured to react to received events according to the binary code of the binary program components; and
   at least one connection means, including a third processor of the computing means of the medical imaging device, for setting up logical connections between interfaces of the binary program components and interfaces of the interpreted source code event handler in order for the events generated by the binary program components to be processed by at least one source code event handler where the source code event handler is configured to provide one or more functions in response to the generated events, wherein
   the logical connections between the interfaces of the binary program components and the interfaces of the interpreted source code event handler are changeable to adjust a functionality of the program system during runtime without modifying the binary code of the binary program components; and
   the logical connections are set up by configuring an event distributor, the event distributor configured to be embedded into the runtime environment, to receive the events from one or more of the binary program components and to redistribute the events to at least one of the source code interpreter, the at least one source code event handler and the binary program components, according to instructions of an editable configuration file; and
   at least one configuration binary program component means, including a fourth processor of the computing means of the medical imaging device, for setting up logical, directional connecting paths between interfaces of the binary program components and interfaces of the source code event handlers using an evaluated configuration file, the configuration file maintaining a text-editable list of the binary program components, the source code event handlers, and the logical connection between and among the binary components and the source code event handlers, the configuration file configured to provide means to change the logical connections between and among binary program components and source code event handlers of the program system to alter the program's functionality without amending source code.

27. The system arrangement of claim 26, wherein the connection means are instructions in the editable configuration file to match the events generated by the one or more binary components to the source code event handler and a method of the source code event handler.

* * * * *